(12) United States Patent
Harari

(10) Patent No.: US 8,839,554 B2
(45) Date of Patent: Sep. 23, 2014

(54) CULTIVATION OF TAMARIX TREE FOR BIOMASS FUEL

(75) Inventor: Micha Harari, Gan Yavne (IL)

(73) Assignee: Micha Harai, Gan Yavne (IL)

( * ) Notice: Subject to any disclaimer, the term of this patent is extended or adjusted under 35 U.S.C. 154(b) by 196 days.

(21) Appl. No.: 13/390,591

(22) PCT Filed: Aug. 17, 2010

(86) PCT No.: PCT/IB2010/053701
§ 371 (c)(1),
(2), (4) Date: Feb. 15, 2012

(87) PCT Pub. No.: WO2011/021147
PCT Pub. Date: Feb. 24, 2011

(65) Prior Publication Data
US 2012/0144735 A1  Jun. 14, 2012

Related U.S. Application Data

(60) Provisional application No. 61/235,136, filed on Aug. 19, 2009.

(51) Int. Cl.
*A01H 3/00* (2006.01)
*A01B 79/00* (2006.01)
*A01B 79/02* (2006.01)
*A01C 1/00* (2006.01)
*A01G 1/00* (2006.01)
*A01G 17/00* (2006.01)

(52) U.S. Cl.
CPC .................. *A01G 17/00* (2013.01); *Y02E 50/10* (2013.01); *Y02E 50/30* (2013.01)
USPC ...................................... 47/58.1 R

(58) Field of Classification Search
USPC ............ 111/118, 200; 210/602, 747.1, 747.5; 44/307; 422/164, 643; 47/58.1 SE
See application file for complete search history.

(56) References Cited

U.S. PATENT DOCUMENTS

| 5,947,041 | A * | 9/1999 | Licht | 111/200 |
| 6,250,237 | B1 * | 6/2001 | Licht | 111/200 |
| 8,091,328 | B2 * | 1/2012 | Teetaert et al. | 56/13.6 |
| 8,207,091 | B2 * | 6/2012 | Stoller et al. | 504/138 |
| 2004/0149189 | A1 | 8/2004 | Shu et al. | |
| 2011/0219668 | A1 * | 9/2011 | Cramwinckel et al. | 44/307 |

FOREIGN PATENT DOCUMENTS

| EP | 2286656 A1 * | 2/2011 |
| WO | WO 2009000845 A2 * | 12/2008 |

OTHER PUBLICATIONS

Anonymous. "Tamarix" Wikipedia accessed Sep. 23, 2013.*
Dicks, Lynn "Growing Biofuels in the Desert." Environmental-researchweb Sep. 11, 2008 available at: http://environmentalresearchweb.org/cws/article/news/35770.*
Avni, Adi. "Bioengineering trees and non-food plants for biofuel feedstock." The Manna Center for Plant biosciences Mini-symposium: "Bio-fuels; Scientific, Ethical and Economic Challenges". May 15, 2007 Tel Aviv University available at:http://www.tau.ac.il/lifesci/departments/plant_s/manna/biofuel_Minisymposium%20program4.pdf.*
Hegedus, Reka et al. "Potential phytoremediation function of energy plants (Tamarix *tetranda pall.* and *Saliz vininalis I.*) in effluent treatment of an intensive fish farming system using geothermal water." Acta Universitatis Sapientiae Agriculture and Environment, 1 (2009) 31-37 Jun. 20, 2009.*
Sun et al. "Use of Tamarisk as a Potential Feedstock for Biofuel Production" Sandia Report SAND2011-0354 Jan. 2011.*
Eshel, Amram et al. "Biomass Production by Desert Halophytesn: Alleviating the pressue on food Production" Recent Advances in Energy and Environment. ISBN 978-960-474-159-5 pp. 362-367 University of Cambridge UK Feb. 23-25, 2010.*
DEFRA guidelines for growing short rotation coppice. Aug. 2004.*
"Prospects for Bioenergy from Short-Rotation Crops in Australia" by T.Baker et al, Bioenergy from SRC in Australia 1999. In: Proceedings of the Third Meeting of IEA Bioenergy Task 17. pp. 1-15. Christersson, L. and Wright, L., Eds., Oak Ridge, TN.
"Many Short Rotation Trees and Herbaceous Plants Available As Energy Crops in Humid Lower South, USA", by G.M. Prine,In Proceedings of Bioenergy 2000, Northeast Regional Bioenergy Program. Oct. 15-19, 2000. Buffalo. NY.
Information Leaflet, Foreign Woods, Forest Products Laboratory Forest Service U. S. Department of Agriculture 1954, by Eloise Gerry et al, Forest Products Technologist Division of Timber Growth and Utilization Relations, Report No. 1986, Agriculture-Madison.
"Noxious Range Weeds", by Lynn F. James et al, Westview Press Boulder, San Francisco, Sr Oxford, 1991, pp. 377-386.
Physical Effects of Flooding on Native and Exotic Plant Seedlings: Implications for "Restoring Riparian Forest by Manipulating Flow Regimes", by Crystal M. Levine et al, Final Report for Federal Grant #143HQ96GR02657 (ASU HNJ 8600) submitted to: Water Resources Research Center, University of Arizona, Tucson May 2000, pp. 1-14.
International Searching Authority, International Search Report, Jan. 20, 2011, for application No. PCT/IB 10/53701.
"Wood Properties of Some Firewood Shrubs in Northern India", Biomass 4 (1984) 235-238, by Bajrang Singh et al, Biomass Research Centre, National Botanical Research Institute, Lucknow, India.
"Phytoextraction and phytoexcretion of Cd by the leaves of Tamarix smyrnensis growing on contaminated non-saline and saline soils", by Eleni Manousaki et al, Environmental Research 106 (2008) pp. 326-332.

* cited by examiner

*Primary Examiner* — Wendy C Haas
(74) *Attorney, Agent, or Firm* — Dr. Hanan Farber Patent Agent Ltd.

(57) ABSTRACT

A method for using Tamarix Erect trees for the production of biomass fuel. Tamarix Erect trees are planted and/or cultivated in an area of land. After growth of biomass of the Tamarisk Erect trees, at least a portion of the biomass is harvested for the biomass fuel. The planting may be performed at a density greater than 6000 Tamarix Erect trees per hectare.

19 Claims, 2 Drawing Sheets

CULTIVATION OF TAMARIX TREE FOR BIOMASS FUEL

BACKGROUND

1. Technical Field

The present invention relates to the use of Tamarix trees for production of biomass fuel.

2. Description of Related Art

Global warming may be the most acute ecological problem the world is facing. Mankind may be contributing to global warming through an ever increasing production of greenhouse gases (GHG) e.g. carbon dioxide, which accumulate in the atmosphere and increase the greenhouse effect which tends to increase the average global temperature. Combustion of fossil fuels increases carbon dioxide in the atmosphere. Burning of fossil fuels is arguably a major source of greenhouse gases in the atmosphere. Replacing fossil fuels by renewable fuels or renewable sources of energy may be the most effective way to reduce the emission of greenhouse gases and slow down the global warming process.

The four major types of renewable energy include hydro power, solar power, wind power and biomass. Biomass is biological material of animal or vegetable origins, such as wood, agricultural crops and waste, fats and oils and any other burnable biological material. Biomass is commonly plant matter which is used to generate heat which may be used for the generation of electricity. The most conventional way of using biomass is as solid fuel for direct incineration. The most common biomass sources are forest trees and residues, yard clippings, municipal and agricultural waste and energy crops. Biomass fuel is normally "carbon neutral" because the amount of carbon which is emitted at the time of its burning is equal (or less) to the amount which is absorbed by the plant in its process of vegetative growth. Furthermore, growing energy crops creates a "carbon sink" through "terrestrial carbon sequestration" by increasing soil organic matter/carbon through crop root systems. In addition, since plants and trees absorb and store atmospheric carbon as they grow, growing and using biomass energy crops actively reduces the level of carbon dioxide in the atmosphere in direct proportion to the amount of biomass produced as compared to the original amount of biomass existed before on the same land. More than half of the carbon dioxide emitted annually from fossil-fuel combustion could be "sequestered" by planting high yield biomass crops on available marginal lands in different parts of the world. In addition, energy crops normally contain very low amounts of sulfur, which is a major cause for acid rain and has significantly less nitrogen (NOx), which is a major cause for smog. Energy crops normally have very low ash content. The reason why cultivation of energy crops is not one of the world's most widely used approach is twofold. Firstly the available amount of legitimate forest and agriculture biomass is very limited and secondly after decades of research in attempt to produce "Super Trees" the results, in terms of yield, has been rather disappointing and as a direct consequence the cost remain too high.

Biomass is the only type of renewable energy in which its scope of production is dependent collectively on humanity's decisions and priorities. If, for example, the agriculture areas in the Midwest of the USA will be used for production of biomass they can produce enough biomass to replace all the coal used in the USA (1.1 billion tons per year). However this approach, if adopted, may result in an international disaster as it may dramatically decrease the amount of basic foods available in the world. Moreover, due to low yield of biomass under the climatic conditions in the US Midwest the cost of electricity produced from burning biomass may be more than tripled compared to that of coal.

As has been already commercially demonstrated, solid biomass fuel may replace at least 30% of the coal in coal-fired power plants. The total consumption of coal worldwide is around 5 billion tons per year and therefore the total potential demand for solid biomass fuel, in the world; in the co-firing segment alone is 1.5 billion tons. However, since the calorific value of biomass is 30% lower than that of coal, the actual potential demand is around 2.0 billion tons per year.

Presently, in most cases, growing of biomass as a stand-alone short-rotation crop (SRC) is not economically viable due to not high enough biomass yield. The prevailing procedure is to grow short rotation biomass crops as "co-product" which is normally defined as any material or benefit that result from production of another marketable commodity. Most, if not all, of the short rotation crop for energy presently grown around the world are highly dependent on the availability of heavy subsidies or are in the form of co-product. The highest biomass yield reported is about 35 metric tons per hectare, per year. The yield of 35 metric tons per hectare, per year, even under energy high prices conditions, is not enough to make this crop economically viable. The highest yield achieved under commercial cultivation of biomass crops is typically no more than 22 metric tons per hectare, per year.

Around one third of continental water in the world is saline. Saline (or brackish) water is defined as in land water which is too salty for being used as drinking water and as irrigation water for most available crops. Large parts of the world land are in desert areas where the soil quality and climatic conditions make the cultivation of all available crops practically impossible.

There is thus a need for and it would be advantageous to have a method for biomass production that does not require arable land and/or fresh water required for food crops. The method produces biomass in high enough yields to be supplied to a user at an affordable cost.

BRIEF SUMMARY

According to an aspect of the present invention there is provided a method for using Tamarix Erect trees for the production of biomass fuel. Tamarix Erect trees are planted and/or cultivated in an area of land. After growth of biomass of the Tamarisk Erect trees, at least a portion of the biomass is harvested for the biomass fuel. The planting may be performed with a density greater than 2000 Tamarix Erect trees per hectare. The planting may be performed at a density greater than 6000 Tamarix Erect trees per hectare. The density of the planting is typically between 4000-7000 per hectare. Subsequent to harvesting, coppicing may be performed to produce regrowth of the Tamarix Erect trees. Subsequent to the harvest during up to five years, replanting may be performed from cuttings.

After growth of the biomass of the Tamarix Erect trees, a portion of the biomass is harvested. The harvesting is preferably performed at least once per two years for at least five years after the planting. The harvesting of the biomass may be performed once during a time period of one to three years after the planting. The biomass may regrow after the harvesting without replanting for at least five years. The biomass typically yields 50-120 metric tons per hectare in the first year and 50-200 metric tons per hectare in every year thereafter. The biomass typically regrows after the harvest for at least five years without replanting.

The planting may be adapted to reduce a water table of the area of land. The area of land may have a soil type which may be alkaline, saline, acidic and waterlogged. Tamarix Erect trees may also extract from the area of land, compounds which are salty or alkaline.

The Tamarix Erect (TE) trees can be cultivated in areas where temperature ranges from 52 degrees centigrade to minus 6 degrees centigrade. The Tamarix Erect (TE) trees are cultivated as a short rotation crop for production of the biomass. The cultivating includes irrigating with water which may be saline water, alkaline water, acidic water, rain water, sewage water, partially treated sewage water, water containing boron, brackish water and/or water not usable for irrigation of food crops. The water salinity has electrical conductivity between 3.0 to 12.0 deci-Siemens per meter (dS/m). The sewage water may be treated only by gross filtration. The cultivating may further include irrigation from a watering and fertilizing management and control system.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

The invention is herein described, by way of example only, with reference to the accompanying drawings, wherein.

Figure 1A:
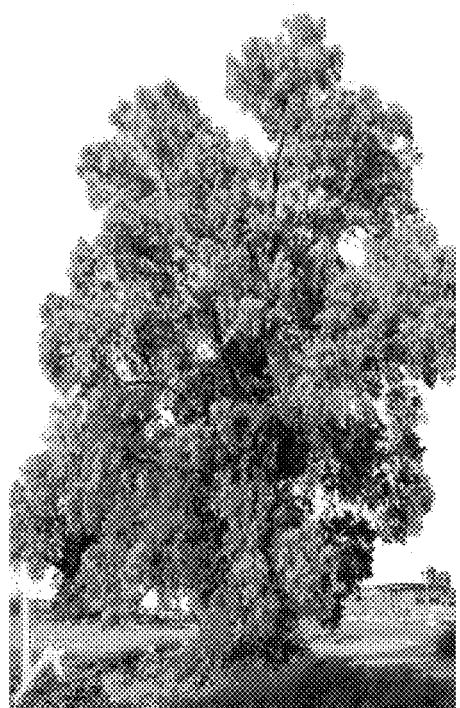
FIGS. 1a, 1b and 1c show three photographs of three tamarisk trees, placed side by side for comparison and visual identification of Tamarix Erect in lieu of a scientific categorization which is presently unavailable.

The foregoing and/or other aspects will become apparent from the following detailed description when considered in conjunction with the accompanying drawing figures.

DETAILED DESCRIPTION

Reference will now be made in detail to aspects of the present invention, examples of which are illustrated in the accompanying drawings, wherein like reference numerals refer to the like elements throughout. The aspects are described below to explain the present invention by referring to the figures.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

By way of introduction, aspects of the present invention are directed to biomass production using a tamarisk plant known as Tamarix Erect (TE). Tamarix Erect (TE) is not scientifically categorized even though it has been known in Israel for at least four decades. Tamarix Erect was cultivated during the 1970s by the Israeli forestry corporation as a wind breaker in the western Negev desert and the Arava valley. The project was abandoned towards the end of the 1970s due to lack of interest. However, the origin of TE is unknown and there is no indication that it exists anywhere outside the boundaries of the state of Israel. TE is not typically found in the wild which is a strong indication to its inability to survive under dry conditions and to its poor natural propagation mechanism.

Rumor has it that the TE was brought from Cyprus but the word in Cyprus is that it was brought to there from Israel. In any case the TE does not exist in Cyprus anymore.

However, Tamarix Erect (TE) can easily be recognized by anyone who is even partially familiar with other Tamarix species as Tamarix Erect is very different in appearance form all other fifteen or so varieties which exist in Israel. The late Professor Y. Waisel and Professor A. Eshel both from the Tel Aviv University have studied the Tamarix Erect as a candidate for desert forestry. Prof. Y. Waisel has attempted with no success to find the origin of Tamarix Erect and where Tamarix Erect exists outside the boundaries of the State of Israel.

Tamarix Erect plants need warm climate and high sun radiation in order to generate a high yield of biomass and Tamarix Erect plants are therefore normally, suitable for cultivation in areas south or north of the equator within latitude 35°.

Two important countries, where the Tamarix Erect may be implemented on a huge scale, are India and Egypt. In some states in India (for example Rajasthan, Gujarat and Tamil Nadu), there are huge amounts of underground saline water next to unused or very poorly used agricultural land. Based on information published by the Rajasthan government, the amount of pumpable saline water in the state may be enough for cultivation of around 300,000 hectares of Tamarix Erect biomass plantations that may produce enough biomass to generate 5,000 mega-watt hours (MWh), year round. Generation of 5,000 MWh, year round, is more or less the amount of extra electricity that Rajasthan will need in the next seven years. It is estimated that a total amount of Tamarix Erect biomass that can be produced in India, by using unused or very poorly used land and water resources, may provide enough biomass fuel to generate at least 100,000 MWh year round. Generation of at least 100,000 MWh, year round, is more or less equal to the total amount of renewable energy (not including hydro power) that is currently produced in the world. For illustration sake, if the 300,000 hectares in semi-arid areas in Rajasthan will be planted with Tamarix Erect this will reduce, in the first year alone, the amount of carbon dioxide in the atmosphere by as much as 150 million metric tons.

A potential demand worldwide for biomass for dedicated standalone biomass power plants or new coal and biomass co-firing facilities is difficult to calculate but in India alone it may reach 250 million metric tons, so a figure of 500 million metric tons for the entire world seems to be a safe estimate. A potential immediate demand for solid biomass fuel is therefore around 2.5 billion per year. Biomass of 2.5 billion metric tons per year, may generate around 520 MWh of electricity year round, compared to an average actual electricity generation from conventional fuels of around 1400 MWh (2007 figures). Incineration of biomass instead of coal therefore may give a reduction of carbon emission of at least 35%. Reducing carbon emission by 35% may well bring carbon emission from electricity generation to the level of 1990 or even a few years before.

Biomass yield of the Tamarix Erect is typically 80 tons per year per hectare. The average irrigation water consumption is around 6,000 meter cubed ($m^3$) per year per hectare. To produce 2.5 billion tons of Tamarix Erect biomass per year, needs for 200 billion meter cubed ($m^3$) of irrigation water per year. Half of this irrigation water amount is available in just four states of NW India (Gujarat, Rajasthan, Punjab and Haryana). The total cultivated land in these states is around 30 million hectares which is enough for production of 2.5 billion metric tons per year of Tamarix Erect biomass.

The figures above including India as an example indicate that there is enough water and enough land resources in relevant countries and regions to produce 2.5 billion tons of Tamarix Erect biomass every year or indeed a much larger amount.

The investment in converting coal fired power plant to a coal biomass co-firing plant is around $100,000 per installed MW of capacity. With a relatively modest investment of around $40.0 B the world's total electricity coal fired capacity can be converted into coal biomass co-firing facilities.

Moreover, it is anticipated that most of the Tamarix Erect biomass will be produced in developing countries and at least 50% of the consumption will be in developed countries. Tamarix Erect may well boost the economy of developing countries (and especially their agriculture sector) and may cause a transfer of wealth from developed countries to developing countries. Costs of a dedicated biomass power plant or a new co-firing facility (i.e. biomass and/or coal) are more or less the same as the investment required in coal fired power plant, so total investment is not increased in converting to biomass. Biomass co-firing with coal is both effective and economically promising because biomass co-firing does not require major investment. Also, big coal fired power plants are normally more efficient than small to middle size biomass plants.

DEFINITIONS

The terms "salinity" and "saline" are defined herein as the increased accumulation of excessive salts in water and/or land. Salinity of water and/or land can be measured by the Electrical Conductivity (EC) of water and/or soil and is measured in deci-Siemens per meter (dS/m).

The term "hectare" as used herein, refers to an area of land, defined as 10000 square meters.

The term "short rotation crop" with respect to trees, refers herein to a crop which is harvested for biomass in a relatively short period of time compared to growth of trees which are harvested for timber for example.

The term "coppicing" as used herein refers to the fact that many trees re-shoot from the stump or roots if cut down. In a coppiced wood young tree stems are repeatedly cut down to near ground level. In subsequent growth years, many new shoots will emerge.

Figure 1B:
Figure 1C:
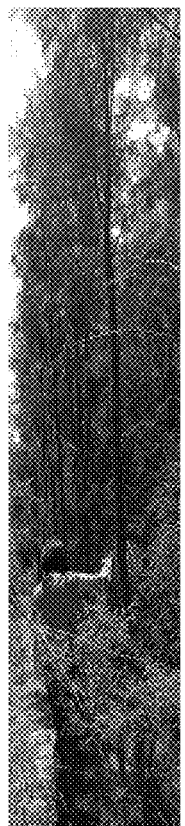

Referring now to the drawings, reference is now made to FIGS. 1a, 1b and 1c which show three photographs of three tamarisk trees 10, 12 and 14 respectively, placed side by side for comparison and visual identification of Tamarix Erect in lieu of a scientific categorization which is presently unavailable. Tree 10 is a *Tamarix Aphylla* variety. Tree 12 is a 15 years old Tamarix Erect (TE) and tree 14 is a 3 years old Tamarix Erect (TE) in a plantation. The terms Tamarix Erect (TE) and *Tamarix aphylla* var. *erecta* are used herein interchangeably. Comparing tree 12 with tree 10, tree 10 has a much wider spread (horizontally) of branches up the main trunk, whereas tree 12 has less spread of branches (horizontally) up the main trunk. Tree 14 whilst younger than tree 12 by twelve years, is in an irrigated plantation as a short rotation crop and is already almost the same height as tree 12.

Figure 2:
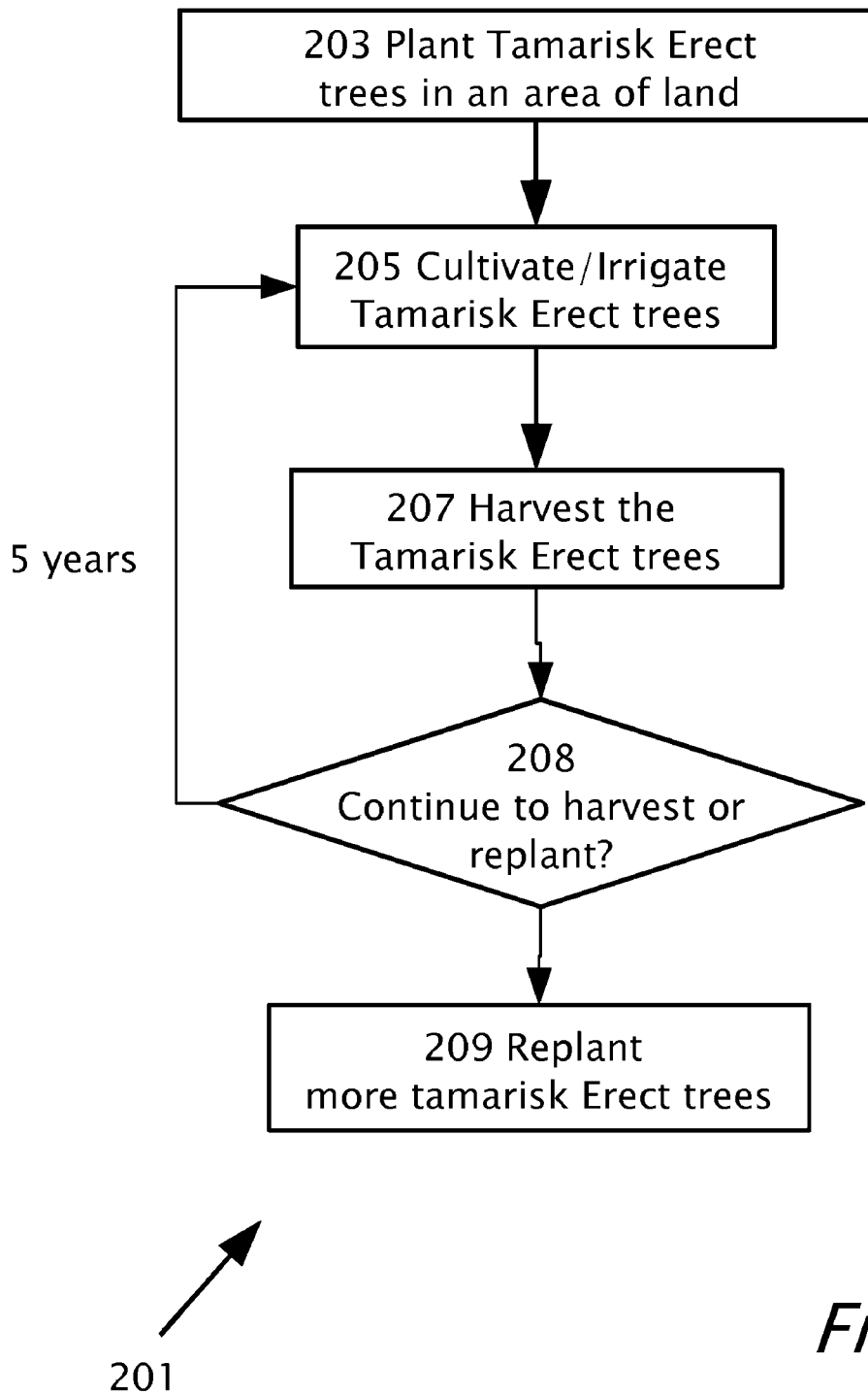
FIG. 2 shows a method for biomass production according to aspects of the present invention.

Reference is now made to FIG. 2 which shows a method 201 for biomass production according to aspects of the present invention. In step 203 Tamarix Erect (TE) plants are planted in an area of land with a number density typically greater than 2000 tamarisk plants per hectare or which provides the greatest yield of biomass harvest. The number density is preferably in a range of 4000 to 7000 tamarisk plants per hectare. The erect nature of Tamarix Erect (TE) allows for 2000 to 8000 tamarisk plants per hectare. The area of land is preferably unsuitable for the planting of food crops, is poorly used agricultural land, land that has soil which is alkaline and/or is waterlogged or soil that is sandy. The area of land is located in areas more suited for Tamarix Erect (TE) such as; desert areas, areas where temperature ranges from 52 degrees centigrade to minus 6 degrees centigrade, areas of the world south or north of latitude 35 degrees and semi-arid areas. However, super high yield can only be obtained in areas where temperature seldom drops under 15 degrees centigrade. A secondary benefit of subsequent growth after planting in step 203 may include; creation of water quality improvement zones where Tamarix Erect (TE) plants serve as a soil desalination and chemical absorption mechanisms, remove salt from saline land or salt introduced from saline water, absorb and remove mineral fractions from water/soil and reduce the water table in water logged land.

Irrigation (step 205) of Tamarix Erect (TE) plants is preferably via a computer controlled fertilization and irrigation system such as AutoAgronom (AutoAgronom Ltd. Ramat HaShofet, Israel). Irrigation of Tamarix Erect (TE) plants may be from water sources such as; saline water (typically between EC 3.0 to EC 12.0), alkaline water, acidic water, rain water, effluent, sewage water, partially treated sewage water, water containing boron, brackish water and non-usable irrigation water. Irrigation step 205 may also be via direct rainfall, water from a water table, waterlogged land or a nearby river.

Harvesting step 207 typically involves cutting down Tamarix Erect (TE) to yield biomass. The biomass is suitable for use as a fuel for generation of steam in power plants as a second fuel in co-firing coal and biomass facilities due to a relatively high caloric value of the Tamarix Erect (TE). Harvesting is performed for at least five years without replanting (step 209) and biomass may be harvested every 1 to 3 years without losing yield. A decision (decision block 208) may be made to continue to harvest or replant depending on weather conditions, soil conditions and availability of resources.

Replanting (step 209) of more Tamarix Erect (TE) may be from cuttings. Replanting step 209 may also not be necessary as stumps left after harvesting, typically re-grow which is known as coppicing and replanting may not need to take place for at least 5 years.

Reference is now made to Tables 1A and 1B which show basic data and biomass results respectively for two groves of Tamarix Erect (TE), located in Yotvata, Israel.

Basic Data

TABLE 1A

| | | | | | |
|---|---|---|---|---|---|
| Location | Yotvata, Israel | Trees age (in month) | 36 | Saline water EC | 10 |
| Date | 13 May 2009 | Ash content | 6% | Net Biomass | 77% |
| Trees per hectare | 5555 (1.8*1.0 m) | Wood humidity | 17% | | |
| Method | 10 trees were selected randomly in each grove. The trees were cut down 15-20 cm above the ground. All green mater was weighed and recorded. | | | | |

Biomass Measurements

TABLE 1B

| Sample | Kg/tree Recycled water | 36 month Ton/Ha Green | 12 month Ton/Ha Green | 12 month Ton/Ha Biomass | Kg/tree Saline water | 36 month Ton/Ha Green | 12 month Ton/Ha Green | 12 month Ton/Ha Biomass |
|---|---|---|---|---|---|---|---|---|
| 1 | 93 | | | | 50 | | | |
| 2 | 82 | | | | 53 | | | |
| 3 | 78 | | | | 45 | | | |
| 4 | 45 | | | | 56 | | | |
| 5 | 71 | | | | 57 | | | |
| 6 | 44 | | | | 49 | | | |
| 7 | 91 | | | | 47 | | | |
| 8 | 79 | | | | 54 | | | |
| 9 | 88 | | | | 53 | | | |
| 10 | 74 | | | | 51 | | | |
| Av. | 74.5 | 414 | 138 | 106 | 51.5 | 286 | 95 | 73 |
| Max | 93 | 517 | 172 | 133 | 53 | 294 | 98 | 76 |
| Min | 44 | 244 | 81 | 63 | 45 | 250 | 83 | 64 |

Both groves are located in the same site in Kibbutz Yotvata in the southern Arava valley in Israel. The climate in the area of southern Arava valley is extremely hot and dry with temperature in the summer regularly above 40° C. The winter is mild and temperatures seldom drop under 10° C. The humidity is normally around 20%. Average precipitation is 20 mm per year and there are very few cloudy days. The radiation around the year is very high. Both groves were irrigated with a drip irrigation system. However, due to technical reasons, availability problems and management difficulties the irrigation was not regular and no record was kept of it.

From the Tables it can be Seen:

1. The combined average amount of biomass in both groves is around 90 ton per hectare per year.

2. The average amount of biomass in the recycled water grove is 106 tons of biomass per hectare per year, however, we assume that the two trees with low biomass yield have suffered from lack of water due to drippers clogging. Without these two trees the average go up to 117 tons per hectare.

3. In the saline water grove the average amount of biomass is 73 tons per hectare. Regular irrigation is extremely important in TE cultivation since the tree, being a desert plant switches quite quickly to "dry mode" and stops vegetative growth. It takes the TE sometime to recover from the "dry mode" and go back to "growth mode". In the third year the saline water grove was suffering from too much salt in the soil and very poor irrigation. The manager of the Yotvata farm, who was also responsible for the TE project, insists that there was practically no growth in this grove during the third year and this explains a big part of the difference in biomass amount between this grove and the other grove. Since the growth during the third year was minimal, the yield per year may have been much higher if the harvest had taken place after the second year. The growth rate of the TE after the first 18 months was reduced because of an overcrowded situation and not enough water for irrigation. Under good cultivation procedures much higher yield may be obtained.

According to aspects of this invention, Tamarix Erect is cultivated as a standalone short rotation crop in warm and sun rich areas, on normal, poor, alkaline or saline soil using fresh, saline, alkaline, treated or non treated sewage water and yet achieve a biomass yield of more than 50 tons per hectare per year.

Results of method 201 for producing Tamarix Erect biomass in the above results produce a yield at least three times more biomass per defined area than any commercially available biomass crop. The yield is achieved by using saline water or any other poor quality water, which is not suitable for cultivation of any other large scale crop. Furthermore, Tamarix Erect (TE) biomass can be cultivated in desert area and in saline or alkaline land which is normally unusable for other crops.

The definite articles "a", "an" is used herein, such as "a tree", have the meaning of "one or more" that is "one or more trees".

Examples of various features/aspects/components/operations have been provided to facilitate understanding of the disclosed embodiments of the present invention. In addition, various preferences have been discussed to facilitate understanding of the disclosed embodiments of the present invention. It is to be understood that all examples and preferences disclosed herein are intended to be non-limiting.

Although selected embodiments of the present invention have been shown and described individually, it is to be understood that at least aspects of the described embodiments may be combined. Also although selected embodiments of the present invention have been shown and described, it is to be understood the present invention is not limited to the described embodiments. Instead, it is to be appreciated that changes may be made to these embodiments without departing from the principles and spirit of the invention, the scope of which is defined by the claims and the equivalents thereof.

The invention claimed is:

1. A method for using *Tamarix aphylla* var. *erecta* trees for the production of biomass fuel, the method comprising:
    planting a plurality of *Tamarix aphylla* var. *erecta* trees in an area of land, wherein said planting is performed at a number density greater than 2000 *Tamarix aphylla* var. *erecta* trees per hectare;
    cultivating said *Tamarix aphylla* var. *erecta* trees; and
    after growth of biomass of said *Tamarix aphylla* var. *erecta* trees, harvesting at least a portion of said biomass for the biomass fuel.

2. The method of claim 1, wherein said planting is performed at a density between 4000 and 12000 *Tamarix aphylla* var. *erecta* trees per hectare.

3. The method of claim 1, wherein said planting is performed at a density between 2000-8000 per hectare.

4. The method of claim 1, wherein subsequent to said harvesting, further comprising, subsequent to said harvesting:
    coppicing to produce thereby regrowth of said *Tamarix aphylla* var. *erecta* trees.

5. The method of claim 1, further comprising
    replanting more *Tamarix aphylla* var. *erecta* trees subsequent to said harvesting for at least five years.

6. The method of claim 5, wherein said replanting is from cuttings taken subsequent to said harvesting.

7. The method of claim 1, wherein said harvesting is performed at least once per two years during at least five years after said planting.

8. The method of claim 1, wherein said harvesting said biomass is performed once during a time period of one to three years after said planting.

9. The method of claim 1, wherein said biomass regrows after said harvesting without replanting for at least five years.

10. The method recited in claim 7, wherein said biomass yields 50-120 metric tons per hectare in the first year and 50-200 metric tons per hectare in every year thereafter.

11. The method of claim 1, wherein said *Tamarix aphylla* var. *erecta* trees are cultivated as a short rotation crop for production of said biomass.

12. The method of claim 1, wherein said cultivating of *Tamarix aphylla* var. *erecta* trees is performed in areas where temperature ranges from 52 degrees centigrade to minus 6 degrees centigrade.

13. The method of claim 1, further comprising:
selecting said area of land to have a soil type selected from a group consisting of: alkaline, saline, acidic and waterlogged.

14. The method of claim 1, wherein said planting is adapted to reduce a water table of said area of land.

15. The method of claim 1, wherein said *Tamarix aphylla* var. *erecta* trees extract a compound selected from the group consisting of a salt and an alkaline compound from soil of said area of land.

16. The method of claim 1, wherein said cultivating includes irrigating with water selected from the group consisting of: saline water, alkaline water, acidic water, rain water, sewage water, partially treated sewage water, water containing boron, brackish water and water not usable for irrigation of food crops.

17. The method of claim 16, wherein said water salinity has electrical conductivity between 3.0 to 12.0 deci-Siemens per meter (dS/m).

18. The method of claim 16, wherein said sewage water is treated only by gross filtration.

19. The method of claim 1, wherein said cultivating includes irrigating from a watering and fertilizing management and control system.

* * * * *